(12) United States Patent
Menke

(10) Patent No.: US 6,507,154 B1
(45) Date of Patent: Jan. 14, 2003

(54) CIRCUIT FOR OPERATING WARNING LIGHTS

(75) Inventor: W. Kenneth Menke, Glendale, MO (US)

(73) Assignee: The Fire Products Company, Webster Groves, MO (US)

( * ) Notice: Subject to any disclaimer, the term of this patent is extended or adjusted under 35 U.S.C. 154(b) by 0 days.

(21) Appl. No.: 09/961,215

(22) Filed: Sep. 21, 2001

(51) Int. Cl.[7] .............................................. B60Q 1/02
(52) U.S. Cl. ........................ 315/83; 315/193; 315/362; 307/10.6; 307/10.8
(58) Field of Search ..................... 315/83, 82, 185 R, 315/189, 193, 362; 307/10.6, 10.8

(56) References Cited

U.S. PATENT DOCUMENTS

| | | | |
|---|---|---|---|
| 2,714,689 A | 8/1955 | Waguet | 315/92 |
| 3,252,137 A | 5/1966 | Montgomery | 340/85 |
| 3,508,237 A | 4/1970 | Kimmelman | 340/251 |
| 3,603,840 A | 9/1971 | DuRocher | 315/82 |
| 3,732,461 A | 5/1973 | Bickl et al. | 315/130 |
| 3,973,238 A | 8/1976 | Kato et al. | 340/81 R |
| 3,987,424 A | 10/1976 | Brouwer et al. | 340/251 |
| 4,222,047 A | 9/1980 | Finnegan | 340/641 |
| 4,259,659 A | 3/1981 | Ariyoshi et al. | 340/73 |
| 4,284,974 A | 8/1981 | Ishida et al. | 340/81 R |
| 4,329,625 A | 5/1982 | Nishizawa et al. | 315/158 |
| 4,684,819 A * | 8/1987 | Haag et al. | 315/82 |
| 5,266,840 A | 11/1993 | Leipold et al. | 307/125 |
| 5,515,028 A * | 5/1996 | Dittmar | 307/10.8 |
| 5,903,107 A | 5/1999 | Wade | 315/129 |
| 5,955,945 A | 9/1999 | Fuhrer | 340/479 |

* cited by examiner

Primary Examiner—Don Wong
Assistant Examiner—Thuy Vinh Tran
(74) Attorney, Agent, or Firm—Thompson Coburn LLP

(57) ABSTRACT

The present invention pertains to an electrical circuit for operating warning lights that are commonly used on emergency and service vehicles. The electric circuit enables the use of pairs of 21 volt DC halogen lamps on a light bar installed on an emergency vehicle equipped with a 42 volt electrical system.

22 Claims, 8 Drawing Sheets

CIRCUIT FOR OPERATING WARNING LIGHTS

BACKGROUND OF THE INVENTION (1) Field of the Invention

The present invention pertains to an electrical circuit for operating warning lights that are commonly used on emergency and service vehicles. The warning lights incorporate halogen lamps and a rotating reflector. The reflector rotates or oscillates about the halogen lamp to give the appearance of a flashing light. The electrical circuit of the present invention provides a circuit for operating standard halogen lamps having a rating of 18–21 volt DC and a power rating of between 25–50 watts on vehicles having a 36–42 volt electrical system.

(2) Description of the Related Art

Since the invention of the rotating beacon in the 1940s, the vast majority of emergency and service vehicles have been protected by warning lights that use an incandescent lamp. In these systems, the lamp is given the appearance of flashing by a rotating reflector positioned in the warning light. The reflector is rotated around the lamp and produces a rotating, reflected arc of coverage and a level of warning within a specified zone around the emergency vehicle.

Although some emergency vehicles use other warning light systems, such as light emitting diodes (LEDs) and gaseous discharge tubes (strobe systems), the use of a halogen lamp and a rotating reflector is preferred and used on a majority of warning light systems because of its initial low cost, high efficiency, easy maintenance, and long life. With the advent of reasonably priced halogen incandescent lamps, the halogen cycle lamp, with its higher efficiency, has become a light source of choice, and these other systems have yet to match any of the advantages of the halogen lamp system.

Typically, standard halogen lamps are rated for operation between 12 and 24 volts and for operation between 25 and 50 watts. Current operational characteristics of the halogen lamps make them very adaptable for use on automobiles having electrical systems operating at between 12 and 14 volts. However, automobile manufacturers have recently announced the introduction of automobiles that will use a 42 volt electrical system. Thus, the change in the automotive voltage from 12 volts DC to 42 volts DC precludes the transfer of existing warning light systems to new emergency vehicles, as is commonly done today by many municipalities.

Additionally, the change in the electrical systems of automobiles to 42 volts presents other problems. At this time, no lamp manufacturer is able to manufacture a halogen lamp in the 25 to 50 watt range that can operate at 42 volts in automotive service. In automotive systems that use halogen lamps, there is a minimum diameter of tungsten filament that is required to maintain the halogen cycle. In order to develop a halogen lamp that operates at voltages that have been increased three-fold from 14 to 42 volts, for a given minimum practical filament diameter, the filament length must also increase three-fold. This consequently causes the wattage of the lamp to increase three-fold. While it is theoretically possible to replace three 50 watt elements with one 150 watt element, in reality, it is difficult to get the distribution of light (arc of coverage) that is desired in order to provide adequate levels of warning.

For instance, a typical light bar for an emergency vehicle is equipped with a system of halogen lamps that may be selectively illuminated to provide three different levels of warning. Each level of warning provides a different arc of coverage around the vehicle, and, generally speaking, two 50 watt lamps are provided in different sets at different positions on the light bar to generate the required arc of coverage and level of warning. In a low level warning condition, two 50 watt lamps are provided on the light bar to only cover the rear of the emergency vehicle. For an increased level of warning, the two 50 watt lamps are provided for rear only coverage and four 50 watt lamps are provided for additional coverage on the front, sides and rear of the vehicle. In a further increased level of warning, the two 50 watt lamps are provided for rear only coverage, the four 50 watt lamps are provided for additional coverage to the front, sides, and rear of the vehicle, and two additional 50 watt lamps are provided for added coverage to the front. As discussed earlier, increasing the voltage of the vehicle three-fold to 42 volts would also require increasing the wattage of the warning lamps three-fold to 150 watts. However, it is difficult to use a combination of 150 watt lamps, with each 150 watt lamp replacing three 50 watt lamps, and obtain this type of coverage. Moreover, the loss of a single 150 watt lamp causes a catastrophic loss of protection, in effect being equivalent to losing three 50 watt lamps. Thus, it is desired to continue the use of standard halogen lamps on current light bars and to adapt the light bar to operate with a 42 volt electrical system.

Halogen lamps in the 25 to 50 watt range have been successfully manufactured for operation in automotive service with voltages up to 24 volts. Although placing two 21 volt halogen lamps in series produces the required 42 volt voltage drop, placing two 21 volt lamps in series for operation at 42 volts presents problems that are unacceptable for operation in a light bar application. When two 21 volt lamps are placed in series, if one lamp fails, both are extinguished. Obviously, this presents an unsatisfactory condition in an apparatus designed to provide visible warning.

Additionally, connecting two halogen lamps in series produces a high rate of start-up failure for the lamps. The cold-resistance of the lamp filament of a typical halogen lamp is very small and varies substantially from lamp to lamp even between new lamps produced from the same manufacturer having identical ratings and capacity. For example, the cold resistance of the filament of a 14 volt, 50 watt halogen lamp may vary from 0.3 ohms to 0.7 ohms, although when lighted and heated, the filaments of identical lamps have virtually the same resistance of about 3.5 ohms. When a mix of new and old lamps from different manufacturers are measured, the cold resistance of the lamp filaments can vary even more. Taking into account the variations in the socket contact resistances and wire lengths in the light bar, the effective cold resistance of each lamp in the light bar greatly varies. This variation in cold resistance makes operating the halogen lamps in series problematic.

The inventor has observed that the filament life in a halogen lamp is a function of the voltage applied, the ambient temperature of the lamp's glass envelope, and the heat sinking effect provided by the socket structure. The inventor has seen that at room temperature and voltages above 17 volts, the time to failure of the typical halogen lamp is very short. In a series connected arrangement, when the circuit is energized, each lamp will have a different initial voltage drop thereacross due to their different resistances. As the filament heats to incandescence, the voltages across the lamps will equalize. However, when the lamps are connected in series and the circuit is initially energized, the mismatch in cold resistances of the filaments often creates a high voltage drop across one of the two lamps. This increases the failure rate of the lamp. In order to limit failure when lamps are connected in series, the lamp with the lower resistance filament must heat quickly to gain resistance so as to prevent failure of the higher resistance filament of the other lamp with which it is connected in series. Again, this condition is unacceptable in an apparatus designed to provide visible warning.

Therefore, what is needed is a light bar that allows the use of standard halogen lamps having a voltage rating of between 18 and 21 volts and a power rating of between 25 to 50 watts on an emergency vehicle equipped with a 36–42 volt DC electrical system. Such a light bar would be provided with an electrical circuit to allow use of standard halogen lamps in the standard light bar when it is installed on a new emergency vehicle equipped with the 36–42 volt electrical operating system. Such a circuit would allow the use of halogen lamps having different cold resistances. Such a circuit would protect mismatched lamps from failure during start up. Such a circuit would maintain the required level of warning in case of failure of a lamp. Such a circuit would be easily retrofitted onto existing light bars to permit the light bar to be installed on new automobiles equipped with the 36–42 volt DC electrical system.

SUMMARY OF THE INVENTION

The electrical circuit of the present invention enables current users of halogen lamp warning lights to use a standard halogen lamp having a voltage rating of between 18 and 21 volts DC in a light bar. The electrical circuit is installed in light bars that are to be used on emergency vehicles equipped with the 36–42 volt electrical systems. The circuit basically enables the series connection of 18–21 volt lamps of the light bar, thereby adapting the light bar for use on a vehicle with a 36–42 volt electrical system. The electrical circuit of the present invention prevents start up failure of the halogen lamps and maintains the required level of warning in case of failure of a lamp.

The circuit of the present invention provides a first lamp paired with a first resistor, and a second lamp paired with a second resistor. The circuit also includes means for switching the circuit between a start up circuit where the series connected first lamp and first resistor are connected in parallel with the series connected second lamp and second resistor, and an operation circuit where the first lamp is disconnected from the first resistor and the second lamp is disconnected from the second resistor and the first lamp is connected in series with the second lamp. The switching means employs a time delay switch that is operable to switch the circuit from the start up circuit to the operational circuit after the first and second lamps reach incandescence. Thus, in the start-up circuit, the circuit allows the lamps to become illuminated through their respective resistors and achieve a uniform and relatively high illuminated resistance before the lamps are switched into a series connection in the operation circuit.

In another aspect of the invention, the switching means switches the circuit from the operation circuit to the start up circuit when the series connection between the first and second lamps is opened by either a lamp failure or a lamp being removed from the circuit. Thus, the electric circuit of the present invention maintains one of the operational lamps illuminated by reconnecting the operational lamp through its resistor in the start-up circuit. In this way, the desired level of warning may be maintained in the event of a failure of one of the two lamps. Preferably, the switching means allows the circuit to be operated as required with the one operational lamp until the other failed lamp is replaced.

The electric circuit of the present invention uses a resistor having a relatively high cold resistance in series with each lamp to bring the lamp to incandescence. The circuit of the present invention connects two lamps in series only after each lamp has reached incandescence, thus preventing start up failure of the lamps from excessive voltage at initial circuit energization. The circuit of the present invention detects the failure of either of the lamps operating in series and instantly reconnects the lamps to their respective start up resistors, thus allowing the operational lamp to continue to function with minimum degradation of the required level of warning. The circuit of the present invention may be operated and repeatedly turned on and off with the operational lamp continuing to operate at full brightness before the failed lamp is replaced. Thus, the electrical circuit of the present invention allows current 14 volt light bars to be retrofitted to emergency vehicles equipped with the 36–42 volts DC operating system with the 14 volt lamps replaced with pairs of 18–21 volt halogen lamps.

BRIEF DESCRIPTION OF THE DRAWINGS

Further objects and features of the invention are revealed in the following detailed description of the preferred embodiment of the invention and in the drawings, wherein.

Corresponding reference numbers indicate corresponding parts throughout the several views of the drawings.

DETAILED DESCRIPTION OF THE PREFERRED EMBODIMENT

FIGS. 1–4 show schematic representations of the circuit of the invention during different operative modes of the circuit. The basic concept of the circuit is the revelation that, regardless of the filament resistance at room temperature of a halogen lamp, any halogen lamp of a given wattage and voltage can be safely brought to incandescence if placed in series with an equivalent, properly matched resistor. A properly matched resistor being a resistor that has the same nominal resistance as that of the halogen lamp when heated at incandescence and has a relatively high resistance at room temperature. Furthermore, when any two halogen lamps having the same nominal wattage and voltage are brought to incandescence, they can then be disconnected from the start up resistor matched with the lamp and the two lamps can then be placed in series without failure of either of the lamps. Because all lamps will eventually fail in use, when either of the two lamps of the circuit are operating in series and one eventually does fail, the circuit automatically and immediately reconnects both lamps to their matched start up resistors and the operative lamp will continue to function at substantially full brightness. By eliminating the two significant problems of lamp operation in series, the circuit of the invention makes the series operation of pairs of 18–36 volt lamps practical with a 36–42 volt electrical supply source.

Figure 1:
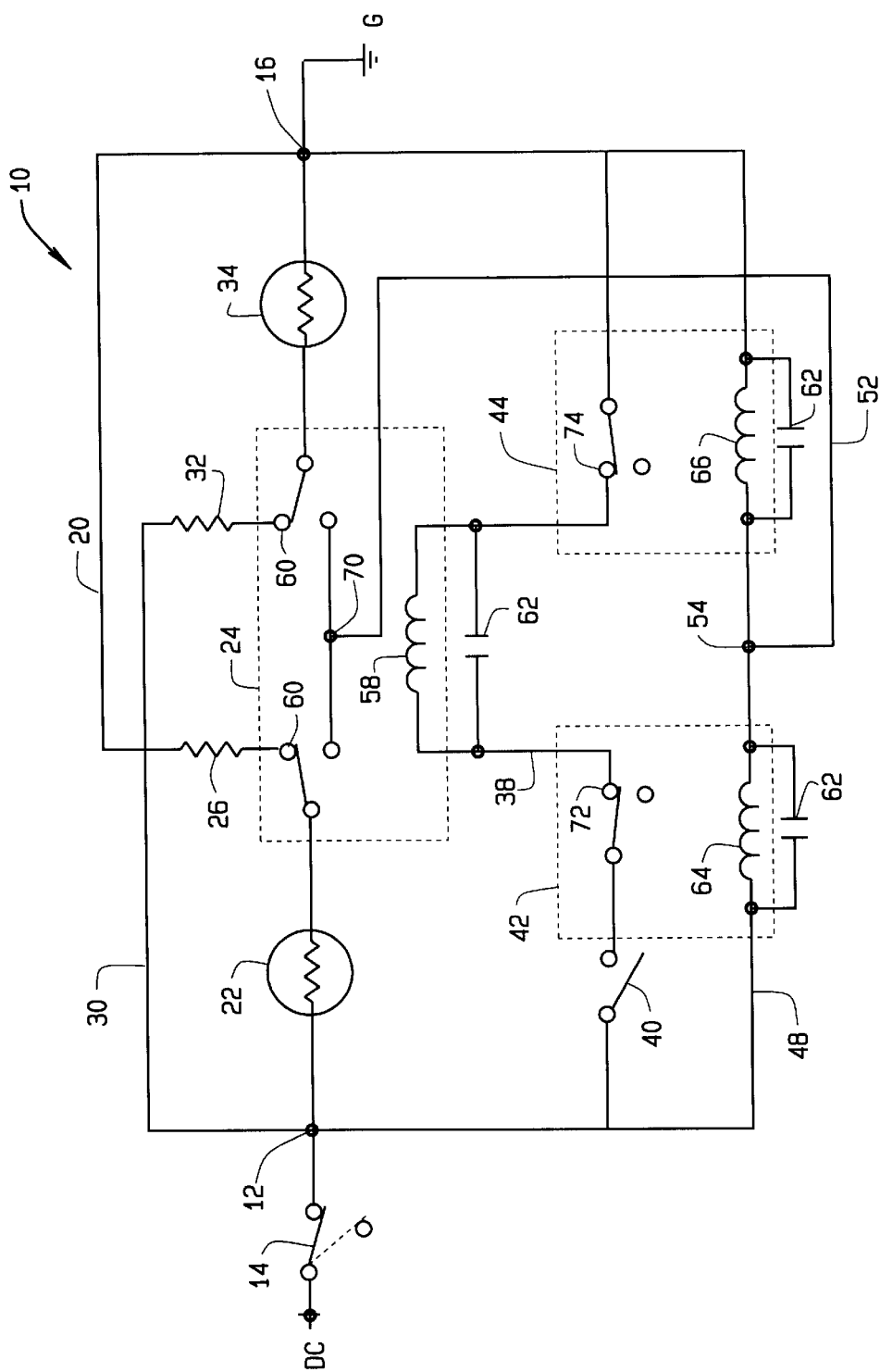
FIG. 1 is an electric circuit diagram showing an alignment of the electrical circuit of the present invention at start-up.

Referring to FIG. 1, the circuit 10 of the invention is provided with a first junction or input junction 12 that is adapted to be connected to a power source, in the illustrative embodiment a 42 volt DC power system. Connection of the first junction 12 with the DC power source is selectively controlled by a first manual switch 14 connected in series between the power source and the first junction. The circuit also includes a second junction or an output junction 16. The second junction 16 is adapted to be connected to a source of ground G. In the illustrative embodiment, the ground G is a ground of a vehicle having a 42 volt DC power system, for example the chassis of the vehicle. Extending between the first, input junction 14 and the second, output junction 16 of the circuit are several different conductive paths that are ultimately connected in series and in parallel to each other in the operation of the circuit to be explained.

The first conductive path 20 extends from the first, input junction 12 to a first lamp 22, preferably a 21 volt DC halogen lamp. From the first lamp 22, the first conduct path continues to a means for switching such as the first switching device 24 represented by dashed lines in the drawing figures. The first switching device 24 is represented in the drawing figures as a double pole, double throw relay. Additional switching devices of the circuit yet to be described are also represented in the drawing figures as electromechanical relays. However, the electromechanical relays shown and to be described are employed in the illustrative embodiment of the circuit to simplify its description. It should be understood that the same circuit of the invention could be made to function using other equivalent means for switching, for example, low resistance, solid state switches such as field effect transistors (FET's). The first conductive path 20 continues from the first switching device to a first resistor 26. In the preferred embodiment, the first resistor 26 has a relatively high resistance at room temperature that substantially matches the resistance of the first lamp 22 when heated at incandescence. From the first resistor 26, the first conductive path 20 continues to its termination at the second output junction 16. Thus, the first conductive path connects in series the first input junction 12, the first lamp 22, the first switching device 24, the first resistor 26 and the second output junction 16.

A second conductive path 30 also begins at the first, input junction 12 and extends to a second resistor 32. From the second resistor 32, the second conductive path 30 extends to the first switching device 24. From the first switching device 24, the second conductive path 30 continues to a second lamp 34 and then continues on to its termination at the second, output junction 16. Thus, the second conductive path 30 provides a series circuit between the first input junction 12, the second resistor 32, the first switching device 24, the second lamp 34 and the second output junction 16. In the preferred embodiment, the second lamp 34 is the same as the first lamp 22 in that it is also a 21 volt DC lamp and has the same resistance when heated at incandescence. In addition, the second resistor 32 is the same as the first resistor 26 having the same resistance as the first resistor.

A third conductive path 38 also begins at the first input junction 12. The third conductive path 38 extends from the first input junction 12 to a time delay switch 40. The time delay switch 40 is operable to remain open for a predetermined period of time when supplied with a predetermined voltage before closing. In the preferred embodiment, the period of time delay is approximately 5 seconds and the minimum voltage applied to the time delay switch 40 causing it to close is 42 volts DC. From the time delay switch 40, the third conductive path 38 continues to a second switching device 42 also represented by dashed lines in the drawing figures. In the drawing figures and in the description to follow, the second switching device, like the first switching device 24 is an electromechanical relay. However, as explained earlier, equivalent types of switching devices may be employed other than the electromechanical relays shown in the illustrative embodiment of the circuit of the invention. In the illustrative embodiment, the second switching device 42 is a single pole, double throw relay. From the second switching device 42, the third conductive path 38 continues to the first switching device 24. From the first switching device 24, the third conductive path 38 continues to a third switching device 44 that is the same as the second switching device 42. From the third switching device 44, the third conductive path 38 continues to its termination at the second, output junction 16. Thus, the third conductive path 38 provides a series circuit between the first, input junction 12, the time delay switch 40, the second switching device 42, the first switching device 24, the third switching device 44 and the second, output junction 16.

A fourth conductive path 48 also begins at the first, input junction 12. From the first input junction 12, the fourth conductive path 48 extends to the second switching device 42. From the second switching device 42, the fourth conductive path 48 continues to the third switching device 44 and then terminates at the second output junction 16. Thus, the fourth conductive path 48 provides a series connection from the first, input junction 12, through the second switching device 42, the third switching device 44 to the second, output junction 16.

The circuit also includes a fifth conductive path 52 that begins at a junction 54 with the fourth conductive path 48 between the second switching device 42 and the third switching device 44. From the junction 54 with the fourth conductive path 48, the fifth conductive path 52 continues to the first switching device 24.

The first start-up stage of operation of the circuit 10 is shown in FIG. 1. In FIG. 1, the manual switch 14 has been moved from its open position shown in dashed lines, to its closed position shown in a solid line. This connects the 42 volt DC power source to the first, input junction 12. When initially connected with power, the time delay switch 40 of the circuit is open preventing power from reaching the coil 58 of the relay employed as an example of the first switching device 24. This allows the pair of normally closed contacts 60 of the first switching device 24 to remain closed, connecting the first lamp 22 in series with the first resistor 26 and the second lamp 34 in series with the second resistor 32. The relays of the second switching device 42 and third switching device 44 have their respective coils 64, 66 connected in series. In the preferred embodiment, each coil 64,66 is a 42 volt coil that each open their contact at about 75% of the coil ratings and hold their contacts open at 50% or less of the coil ratings. The capacitors 62 across each of the coils 58, 64, 66 of the relays dampen any oscillations and provide added circuit stability.

With the manual switch 14 closed, the circuits through the normally closed contacts 60 of the first switching device 24 are energized and the first lamp 22 is connected in series with the first resistor 26 between the first, input junction 12 and second, output junction 16 and the second lamp 34 is connected in series with the second resistor 32 between the first, input junction 12 and second, output junction 16. Thus, the first conductive path 20 and the second conductive path 30 are each series circuits including a lamp and resistor, and the two series circuits are connected in parallel between the first, input junction 12 and the second, output junction 16. This applies 42 volts to the first lamp 22 in series with the first resistor 26 and to the second lamp 34 in series with the second resistor 32. Both of the lamps 22,34 come to incandescence within a few seconds and stabilize. Because the draw on amperage is greater with the two parallel circuits, each having a lamp 22,34 operating independently through its respectively paired resistor 26,32, than with a single circuit with two lamps operating together in series, the first lamp 22 and second lamp 34 connected in parallel come to incandescence but not full brightness. This soft start of the two lamps provides time for the lamps to stabilize before being connected in series.

Figure 2:
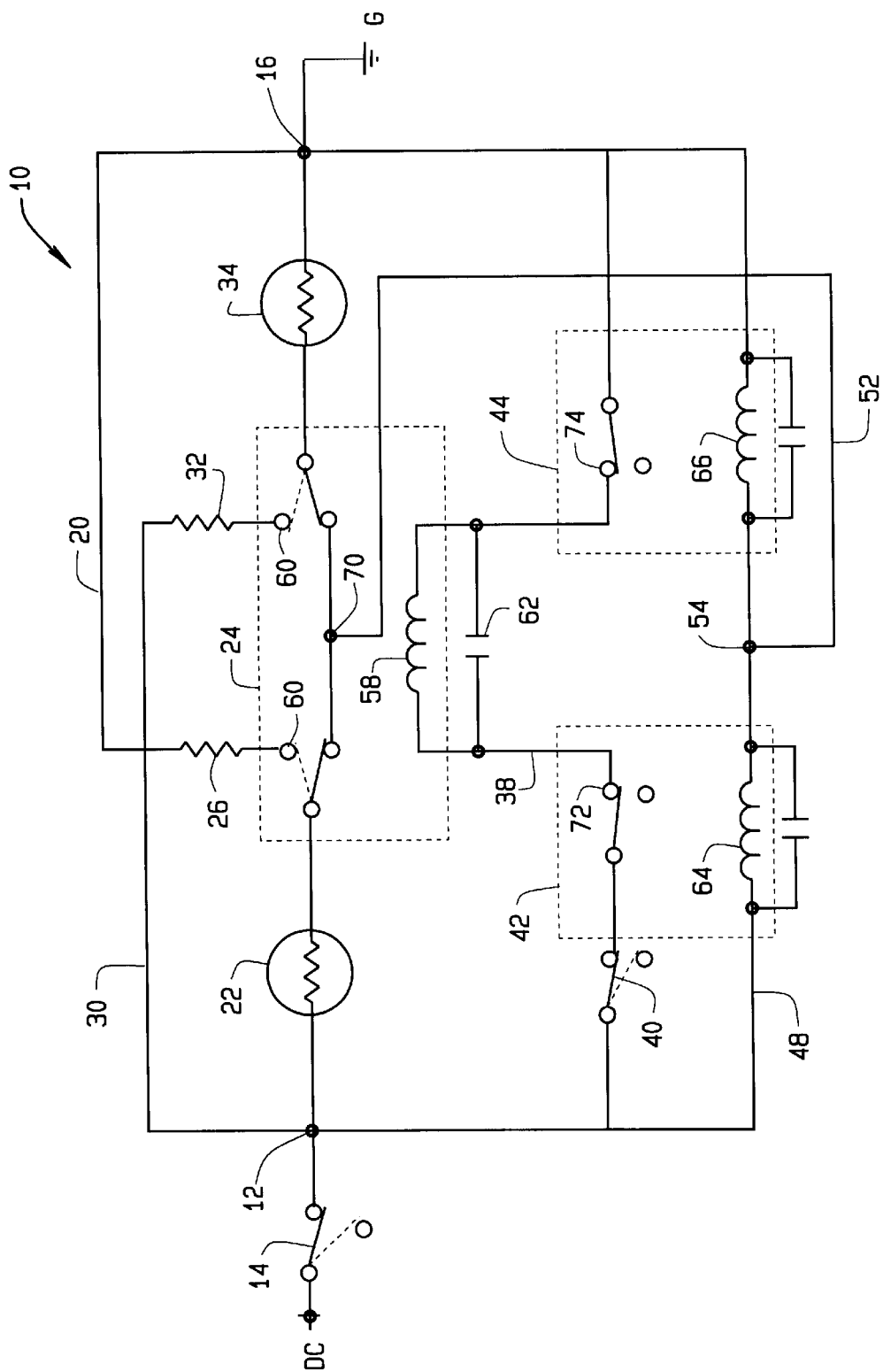
FIG. 2 is an electric circuit diagram showing an alignment of the electrical circuit of the present invention in normal operation.

As shown in FIG. 2, after an interval of about 5 seconds following closing of the manual switch 14, the time delay switch 40 also closes, holds, and applies 42 volts to the coil 58 of the first switching device 24. This voltage applied to the coil of the first switching device 24 causes its contacts 60 to open, disconnecting the first lamp 22 from the first resistor 26 and disconnecting the second lamp 34 from the second resistor 32. The voltage applied to the coil 58 of the first switching device 24 also causes the first lamp 22 to be connected in series with the second lamp 34 as shown in the operational circuit of FIG. 2. With the first lamp 22 and second lamp 34 connected in series across the first switching device 24, 42 volts are applied across the series connected lamps and they come to full brightness. The lamps continue to operate at full brightness until the manual switch 14 is opened. When the manual switch 14 is opened, the voltage source is removed from the circuit and the circuit is deenergized, the first lamp 22 and the second lamp 34 are extinguished and the time delay switch 42 is opened and reset.

As explained earlier, each of the coils 64,66 of the respective second switching device 42 and third switching device 44 are 42 volt coils that cause the contacts of the switching devices to open at about 75% of the coil rating and hold the contacts open at about 50% of the coil ratings. During normal operation of the circuit described above and as illustrated in FIG. 2, with the switching device coils 64,66 being connected in series, and with the series connected coils also being connected in parallel with the series connected first lamp 22 and second lamp 34, about half of the circuit voltage of 21 volts is applied across the two coils. This voltage is inadequate to cause either of the contacts of the second switching device 42 or third switching device 44 to open.

Figure 3:
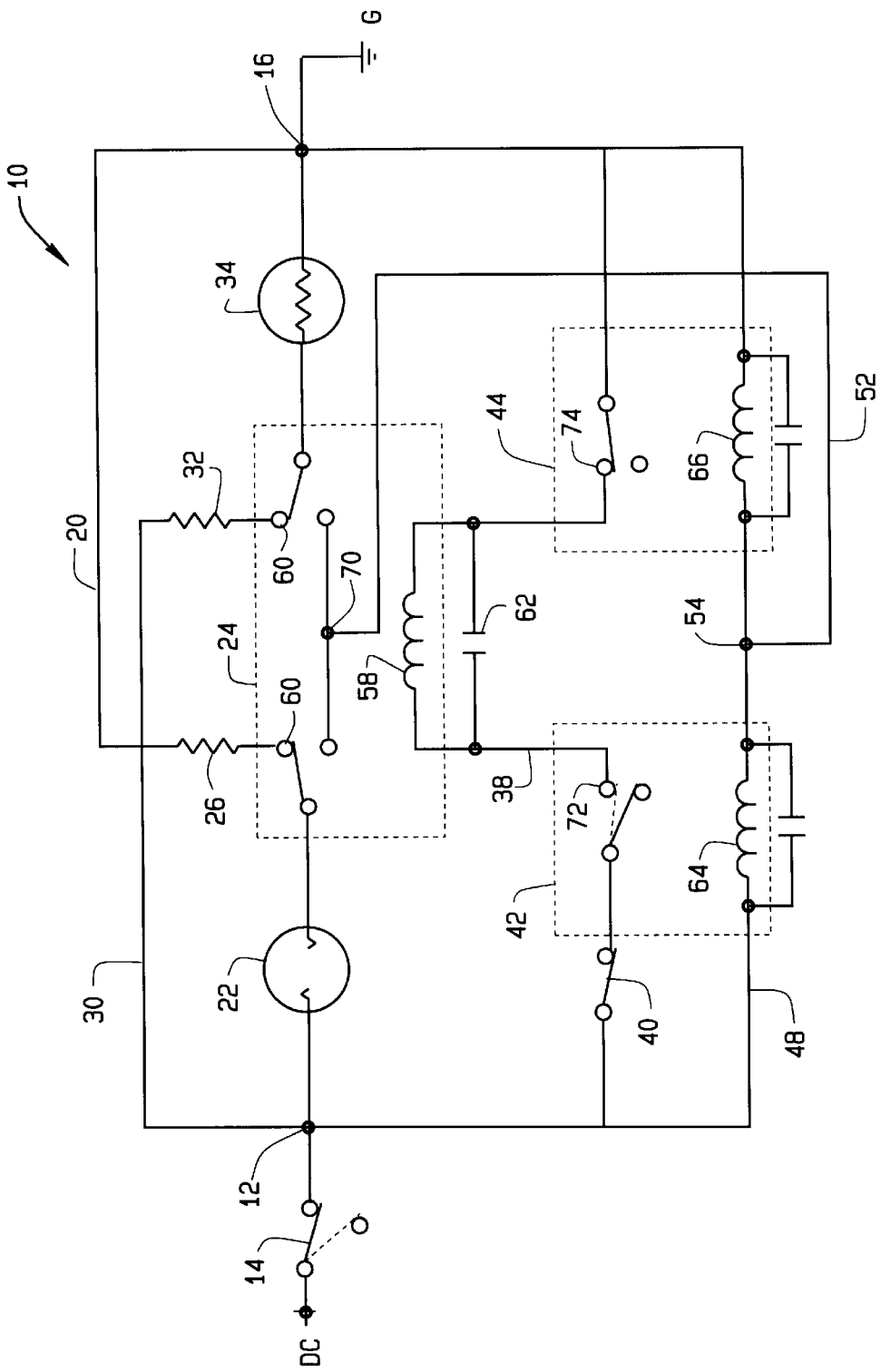
FIG. 3 is an electric circuit diagram showing the alignment of the electric circuit of FIG. 2 after a failure of a first lamp.

If the filament in the first lamp 22 fails, the midpoint 70 of the series connection between the first lamp 22 and the second lamp 34 remains connected to the source of ground G through the filament in the second lamp 34 and the voltage at the midpoint 70 goes to 0 volts. When the series circuit of the two lamps 22, 34 is opened by the failure of the first lamp 22, the voltage across the coil 64 of the second switching device 42 then rises to 42 volts and the contact 72 of the second switching device is opened and holds as illustrated in FIG. 3. When the contact 72 of the second switching device 42 is opened, it breaks the circuit to the coil 58 of the first switching device 24 which then causes its series connection between the first lamp 22 and second lamp 34 to be broken and closes the first switch contacts 60 reconnecting the first lamp 22 in its series connection with the first resistor 26 and reconnecting the second lamp 34 and its series connection with the second resistor 32. The first lamp 22, which has burned out, remains out, but the second lamp 34 is instantly relighted as it is re-energized by reconnection through its paired resistor 32. The change over between the series connection between the two lamps 22,34 and the paired connections of the lamps with their associated resistors is so rapid that it is imperceptible to the human eye and the second lamp 34 appears to be continuously lit throughout the change over.

Opening the manual switch 14 extinguishes the second lamp 34 and closing the manual switch 14 re-energizes the circuit 10 which causes the second lamp 34 to again illuminate in the same manner as described above. Replacing the first lamp 22 restores the circuit 10 to normal operation. Should the second lamp 34 fail before the first lamp 22 is replaced, the circuit continues to function, but of course there is no light from either lamp.

Figure 4:
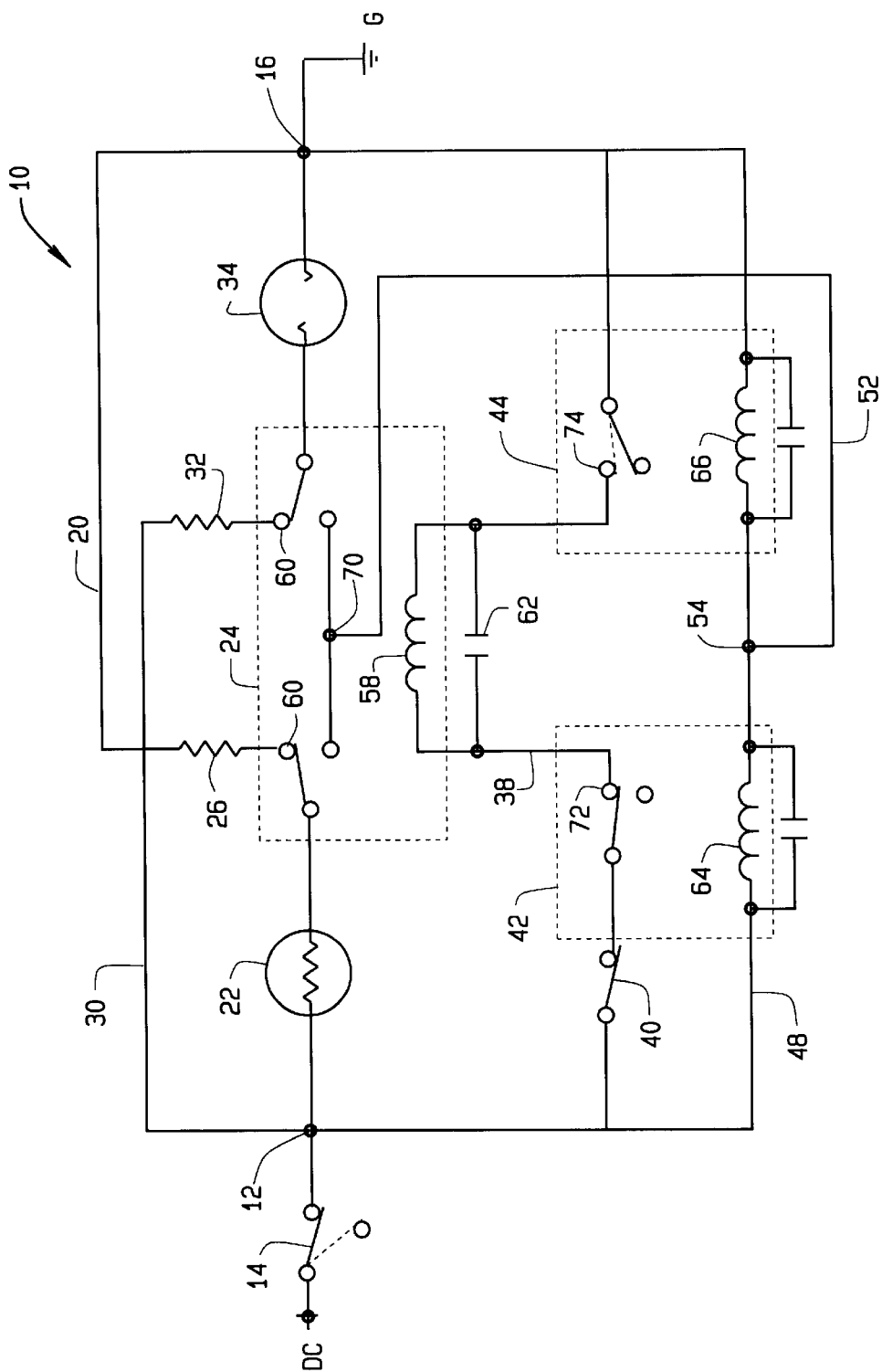
FIG. 4 is an electric circuit diagram showing the alignment of the electric circuit of FIG. 2 after a failure of a second lamp.

In a similar manner as shown in FIG. 4, if during normal operation of the circuit the second lamp 34 should burn out, the voltage at the midpoint 70 of the series connection between the two lamps increases to 42 volts which then causes the coil 66 of the third switching device 44 to open its contact 74. This again breaks the series connection between the first lamp 22 and the second lamp 34 and causes the switch contacts 60 of the first switching device 24 to close. This connects the first lamp 22 to its paired, first resistor 26 and the first lamp continues to operate.

Figure 5:
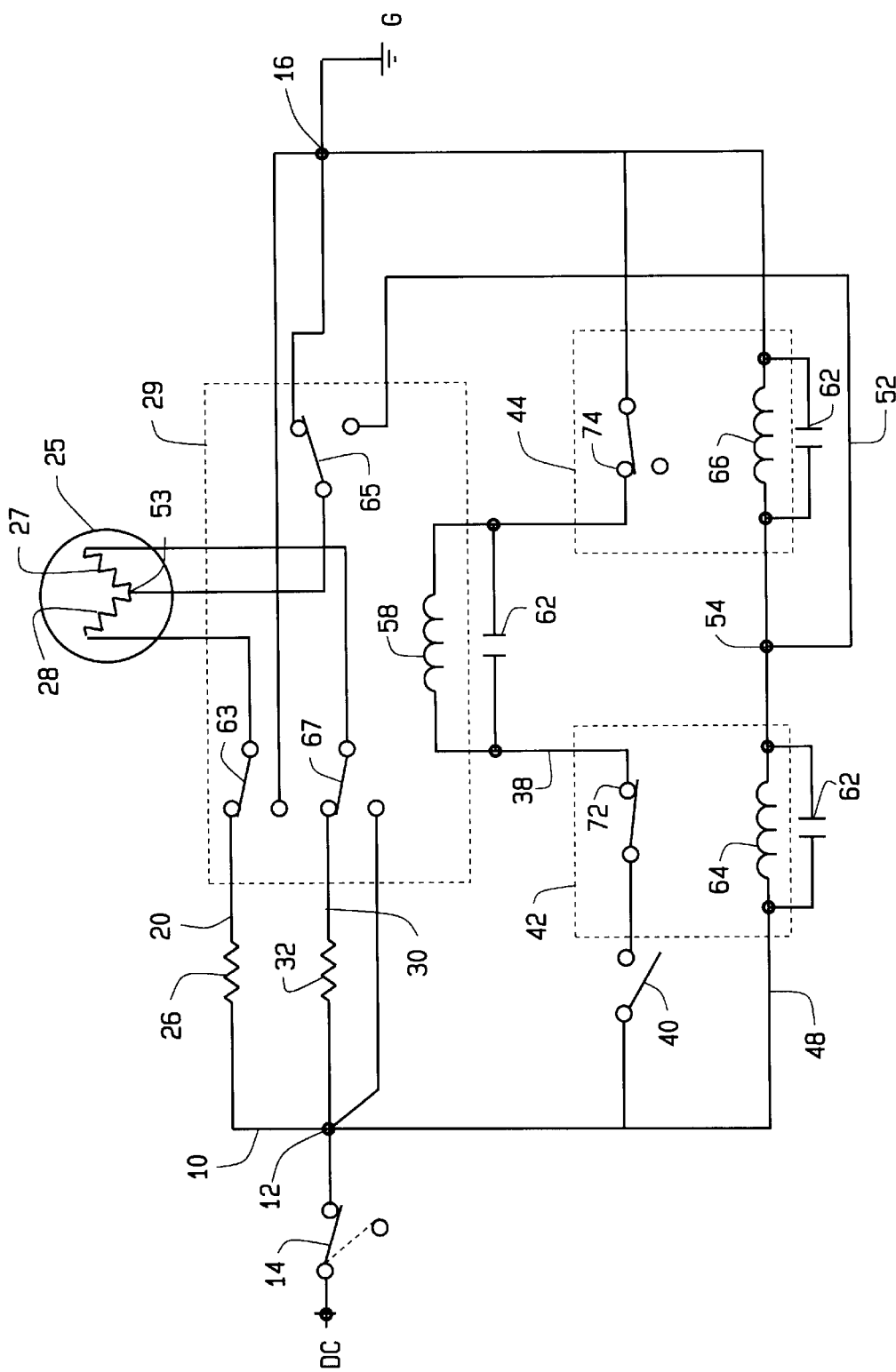
FIG. 5 is an electric circuit diagram showing an alignment of the electrical circuit of the present invention, incorporating a dual filament lamp, at start-up.

Although the drawing figures contained herein show the first and second halogen lamp as being two separate lamp elements, it should be noted that the first and second lamps may be of the type where the lamp filament for each lamp is contained in the same lamp envelope or capsule. Typically, lamps of this type have a double contact, bayonet base that is wired so that one end of each of the filaments is interconnected and have a common termination to the shell. The other ends of each filament are then separately terminated to one of the base contacts. In a circuit using such a style of halogen lamp, the switching means would be configured as shown in FIG. 5 with auxiliary contacts or other switching means to switch the ground connection, as necessary to align the filaments in lamp 25 in parallel with the associated start-up resistor in the start-up circuit or in series together in the operation circuit. Preferably, each filament would be designed to operate at about 25 watts for a total of 50 watts when both filaments are at incandescence. In such style of lamp, in the event of failure of either filament, the other filament would continue to light and provide continued protection at half power. This arrangement would be particularly suited for a light bar having a configuration where there is only one lamp in the circuit to provide the required level of warning, for instance, a single yellow element used in the rear of the light bar.

Referring to FIG. 5, a further embodiment of the circuit 10 of the invention is provided with a first junction or input junction 12 that is adapted to be connected to a power source, in the illustrative embodiment a 42 volt DC power system. Connection of the first junction 12 with the DC power source is selectively controlled by a first manual switch 14 connected in series between the power source and the first junction. The circuit also includes a second junction or an output junction 16. The second junction 16 is adapted to be connected to a source of ground G. In the exemplary embodiment, the ground G is a ground of a vehicle having a 42 volt DC power system, for example the chassis of the vehicle. Extending between the first, input junction 14 and the second, output junction 16 of the circuit are several different conductive paths that are ultimately connected in series and in parallel to each other in the operation of the circuit to be explained.

The first conductive path 20 extends from the first, input junction 12 to a first resistor 26. From the first resistor 26 the first conductive path continues to a means for switching such as the contacts 63 contained in the first switching device 29 represented by dashed lines in the drawing figures. The first switching device 29 is represented in the drawing figures as a three pole, double throw relay. Additional switching devices of the circuit yet to be described are also represented in the drawing figures as electromechanical relays. However, the electromechanical relays shown and to be described are employed in the illustrative embodiment of the circuit to simplify its description. It should be understood that the same circuit of the invention could be made to function using other equivalent means for switching, for example, low resistance, solid state switches such as field effect transistors (FET's). The first conductive path 20 continues from the first switching device to the first lamp filament 28. From the first lamp filament 28 the first conductive path 20 continues to a second set of contacts 65 contained in the first switching device 29. From the first switching device 29, the first conductive path 20 continues to its termination at the second, output junction 16. Thus, the first conductive path connects in series the first, input junction 12, the first resistor 26, the first lamp filament 28, the first switching device 29, and the second, output junction 16.

A second conductive path 30 also begins at the first, input junction 12 and extends to a second resistor 32. From the second resistor 32, the second conductive path 30 extends to the third set of contacts 67 in the first switching device 29. From the first switching device 29, the second conductive path 30 continues to a second lamp filament 27 which merges with the first conductive path 20, and then continues on to its termination at the second, output junction 16. Thus, the second conductive path 30 provides a series circuit between the first, input junction 12, the second resistor 32, the first switching device 29, the second lamp filament 27, and the second, output junction 16. In the preferred embodiment, the second lamp filament 27 is the same as the first lamp filament 28 in that it is also a 21 volt DC filament and has the same resistance when heated at incandescence. In addition, the second resistor 32 is the same as the first resistor 26 having the same resistance as the first resistor.

A third conductive path 38 also begins at the first, input junction 12. The third conductive path 38 extends from the first, input junction 12 to a time delay switch 40. The time delay switch 40 is operable to remain open for a predetermined period of time when supplied with a predetermined voltage before closing. In the preferred embodiment, the period of time delay is approximately 5 seconds and the minimum voltage applied to the time delay switch 40 causing it to close is 36–42 volts DC. From the time delay switch 40, the third conductive path 38 continues to a second switching device 42 also represented by dashed lines in the drawing figures. In the drawing figures and in the description to follow, the second switching device, like the first switching device 29, is an electromechanical relay. However, as explained earlier, equivalent types of switching devices may be employed other than the electromechanical relays shown in the illustrative embodiment of the circuit of the invention. In the illustrative embodiment, the second switching device 42 is a single pole, double throw relay. From the second switching device 42, the third conductive path 38 continues to the first switching device 29. From the first switching device 29, the third conductive path 38 continues to a third switching device 44 that is the same as the second switching device 42. From the third switching device 44, the third conductive path 38 continues to its termination at the second, output junction 16. Thus, the third conductive path 38 provides a series circuit between the first, input junction 12, the time delay switch 40, the second switching device 42, the first switching device 29, the third switching device 44 and the second, output junction 16.

A fourth conductive path 48 also begins at the first, input junction 12. From the first, input junction 12, the fourth conductive path 48 extends to the second switching device 42. From the second switching device 42, the fourth conductive path 48 continues to the third switching device 44 and then terminates at the second, output junction 16. Thus, the fourth conductive path 48 provides a series connection from the first, input junction 12, through the second switching device 42, the third switching device 44 to the second, output junction 16.

The circuit also includes a fifth conductive path 52 that begins at a junction 54 with the fourth conductive path 48 between the second switching device 42 and the third switching device 44. From the junction 54 with the fourth conductive path 48, the fifth conductive path 52 continues to the first switching device 29.

The first start-up stage of operation of the circuit 10 is shown in FIG. 5. In FIG. 5, the manual switch 14 has been moved from its open position shown in dashed lines, to its closed position shown in a solid line. This connects the 42 volt DC power source to the first, input junction 12. When initially connected with power, the time delay switch 40 of the circuit is open, preventing power from reaching the coil 58 of the relay employed as an example of the first switching device 29. This allows the pair of normally closed contacts 63, 67 of the first switching device 29 to remain closed, connecting the first resistor 26 in series with the first lamp filament 28 and the second lamp filament 27 in series with the second resistor 32. The relays of the second switching device 42 and third switching device 44 have their respective coils 64, 66 connected in series. In the preferred embodiment, each coil 64, 66 is a 42 volt coil that each open their contact at about 75% of the coil ratings and hold their contacts open at 50% or less of the coil ratings. The capacitors 62 across each of the coils 58, 64, 66 of the relays dampen any oscillations and provide added circuit stability.

With the manual switch 14 closed, the circuits through the normally closed contacts 63 of the first switching device 29 are energized and the first lamp filament 28 is connected in series with the first resistor 26 between the first, input junction 12 and second, output junction 16 and the second lamp filament 27 is connected in series with the second resistor 32 between the first, input junction 12 and second, output junction 16. Thus, the first conductive path 20 and the second conductive path 30 are each series circuits including a lamp and resistor, and the two series circuits are connected in parallel between the first, input junction 12 and the second, output junction 16. This applies 42 volts to the first lamp filament 28 in series with the first resistor 26 and to the second lamp filament 27 in series with the second resistor 32. Both of the lamp filaments 27 and 28 come to incandescence within a few seconds and stabilize. Because the draw on amperage is greater with the two parallel circuits, each having a lamp filament 27 and 28 operating independently through its respective paired resistor 26, 32, then with a single circuit with two lamp filaments operating together in series, the first lamp filament 28 and second lamp filament 27 connected in parallel come to incandescence but not full brightness. This soft start of the two lamp filaments provides time for the lamps to stabilize before being connected in series.

Figure 6:
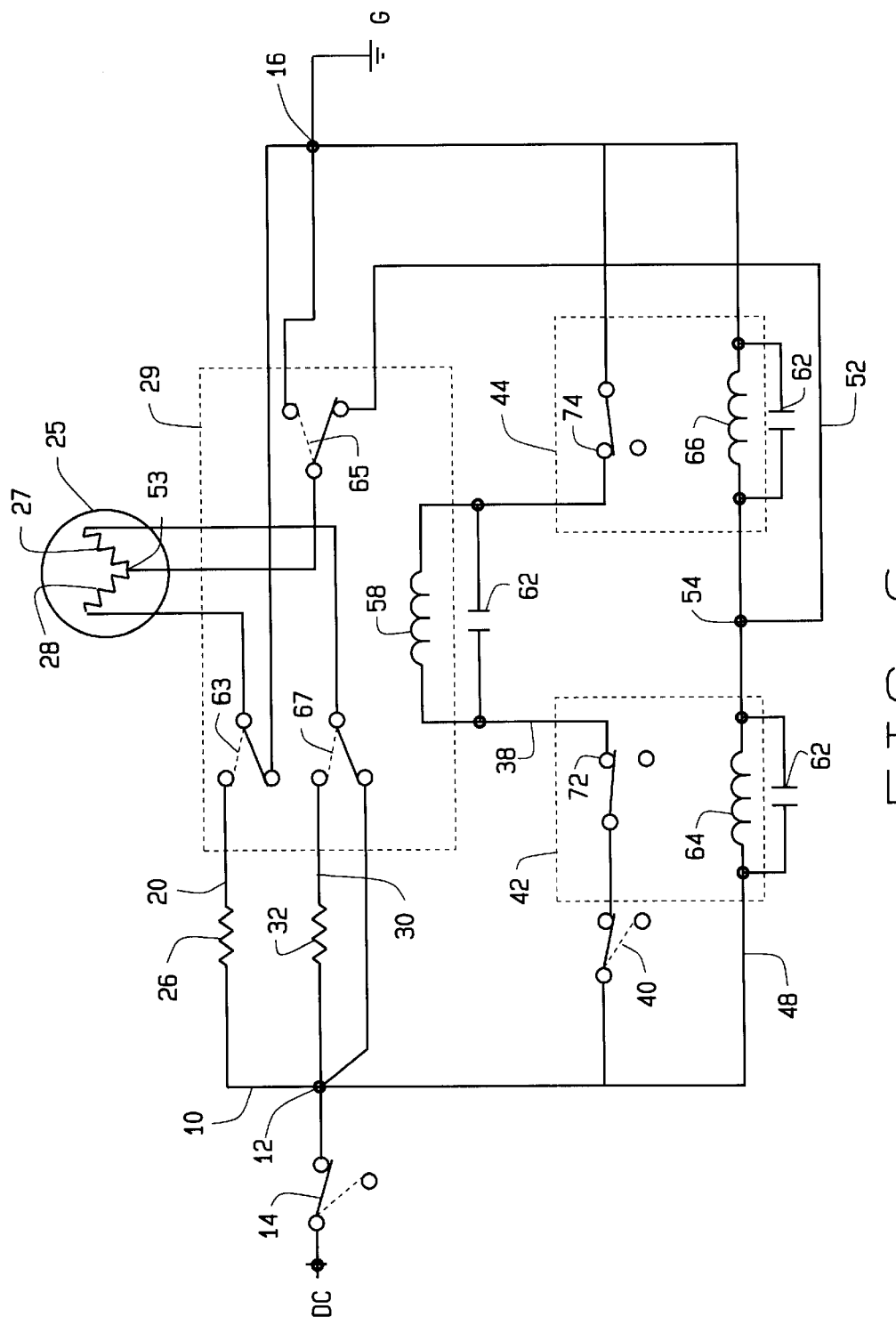
FIG. 6 is an electric circuit diagram showing an alignment of the present invention, incorporating a dual filament lamp, in normal operation.

After an interval of about 5 seconds following closing of the manual switch 14 as shown in FIG. 6, the time delay switch 40 also closes, holds, and applies 42 volts to the coil 58 of the first switching device 29. This voltage applied to the coil of the first switching device 29 causes its contacts 63, 67, and 65 to change over. The change over disconnects the first lamp filament 28 from the first resistor 26 and the second lamp filament 27 from the second resistor 32. The change over also connects first lamp filament 28 to junction 16, and the ground G and connects the second lamp filament 27 to input junction 12 and the source of 42 volts. The change over also disconnects the junction 53 of the first and second lamp filaments 28, 27 from output junction 16 and connects the junction 53 of the filaments to point 54.

With the first lamp filament 28 and the second lamp filament 27 connected in series and 42 volts applied across the series connected lamp filaments, the filaments come to full brightness. The lamps continue to operate at full brightness until the manual switch 14 is opened. When the manual switch 14 is opened, the voltage source is removed from the circuit and the circuit is deenergized, the first lamp filament 28 and the second lamp filament 27 are extinguished and the time delay switch 42 is opened and reset.

As explained earlier, each of the coils 64, 66 of the respective second switching device 42 and third switching device 44 are 42 volt coils that cause the contacts of the switching devices to open at about 75% of the coil rating and hold the contacts open at about 50% of the coil ratings. During normal operation of the circuit described above and as illustrated in FIG. 5, with the switching device coils 64, 66 being connected in series, and with the series connected coils also being connected in parallel with the series connected first lamp filament 28 and second lamp filament 27, about half of the circuit voltage of 21 volts is applied across the two coils. This voltage is inadequate to cause either of the contacts of the second switching device 42 or third switching device 44 to open.

Figure 7:
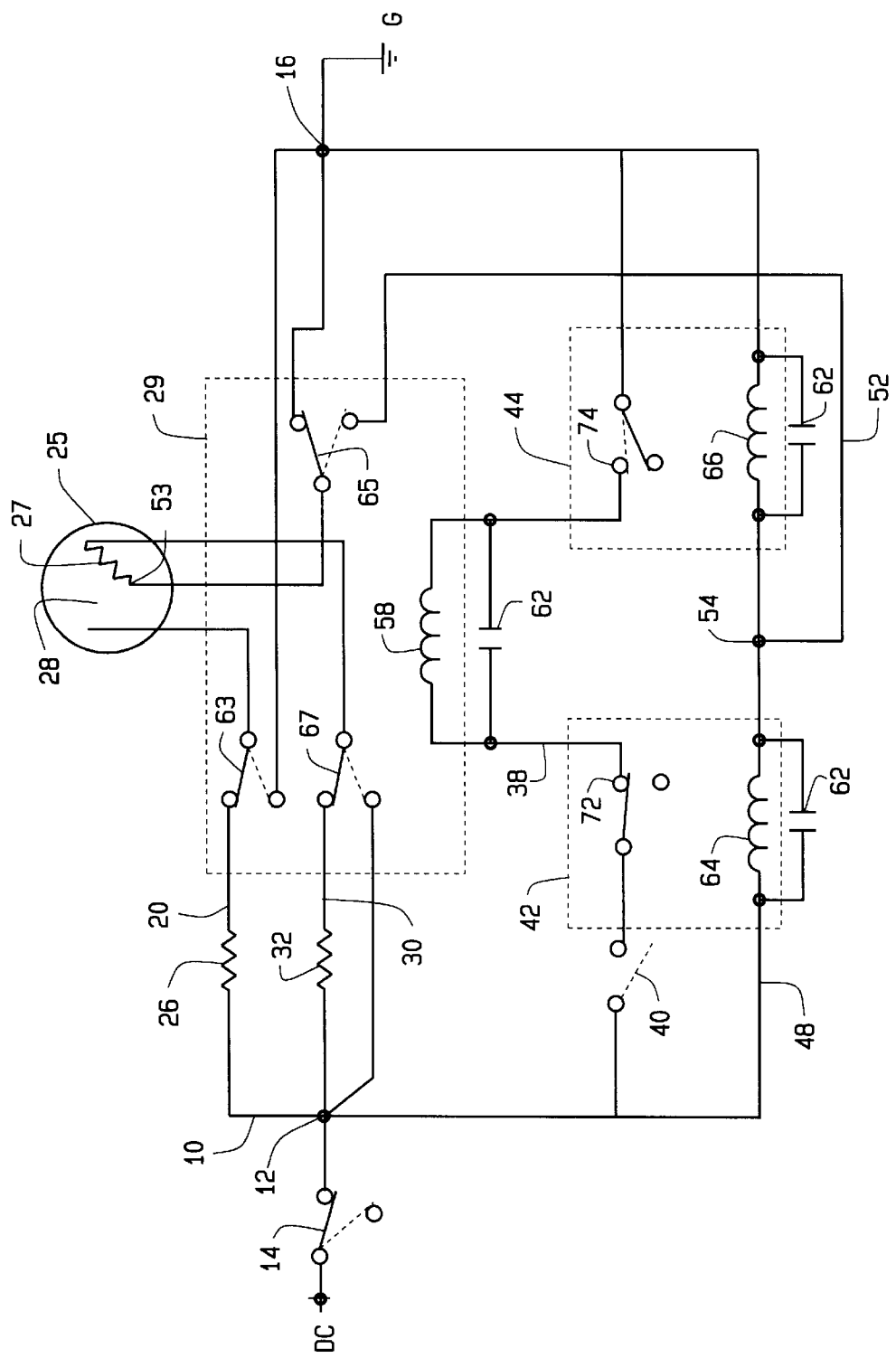
FIG. 7 is an electric circuit diagram showing an alignment of the electrical circuit of the present invention, incorporating a dual filament lamp shown in FIG. 6, after a failure of the first lamp filament.

If the first lamp filament 28 fails as is shown in FIG. 7, point 53 remains connected to input 14 through lamp filament 27 and goes to 42 volts. Point 54 which is connected to point 53 by contact set 65 in the first switch means 29 also goes to 42 volts and in turn closes and holds point set 74 in switching device 44 and breaks the circuit to switching means 29 and returns contacts 63, 67, and 65 to the open position. Lamp filament 27 is reconnected to 42 volts through resistor 32 and to ground through point set 65 and is illuminated.

Figure 8:
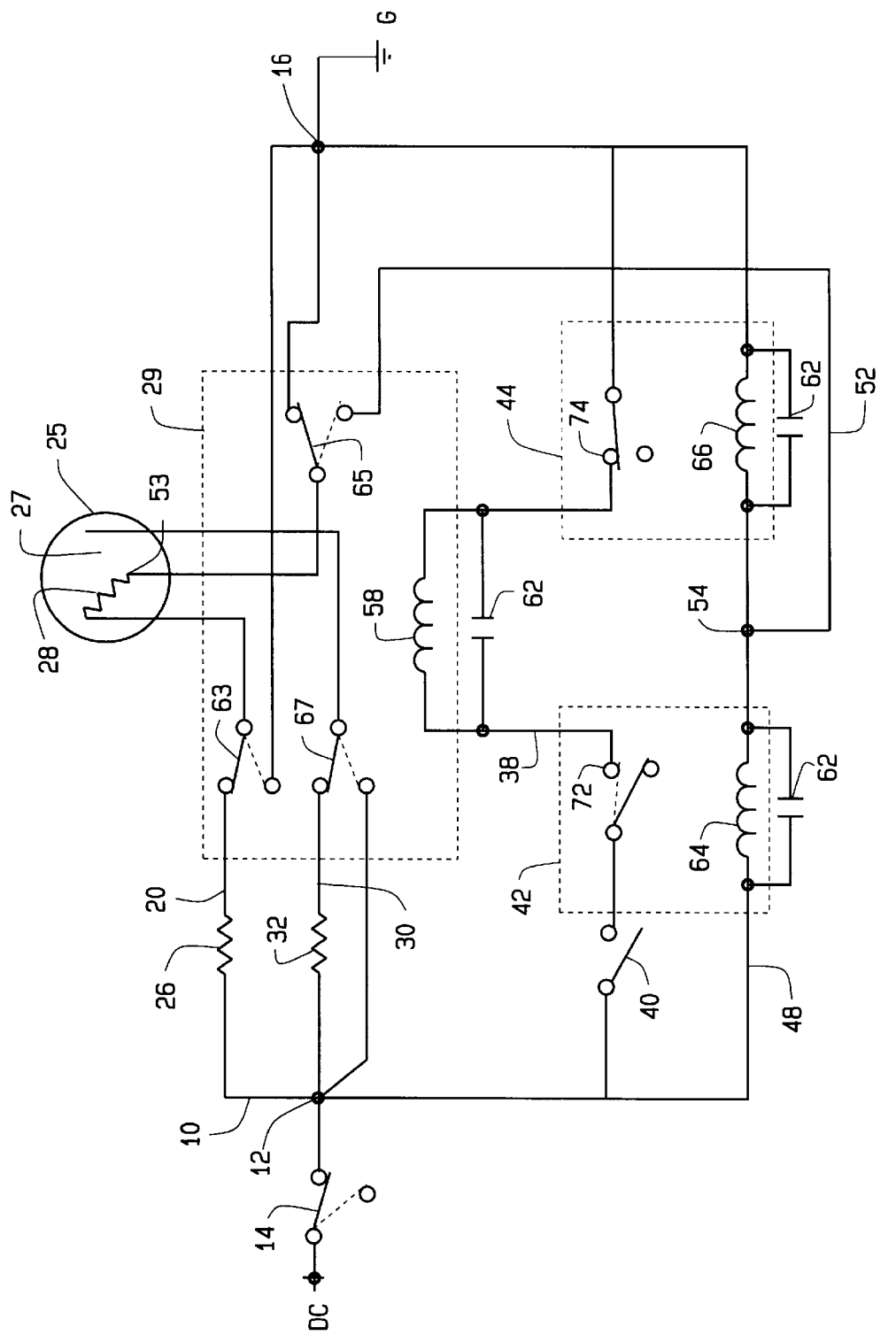
FIG. 8 is an electric circuit diagram showing an alignment of the electrical circuit of the present invention, incorporating a dual filament lamp shown in FIG. 6, after a failure of the second lamp filament.

In an analogous fashion, if lamp filament 27 fails as is shown in FIG. 8, point 53 and 54 go to ground and switching means 42 closes and holds and in turn returns switching means 29 to the open position. Lamp filament 28 is then reconnected to ground through contact set 65 and through contact set 63 to 42 volts through resistor 26 and is illuminated.

Opening and closing switch 14 permits normal operation of the remaining, intact filament. Replacing the lamp restores the normal operation of the circuit.

Although the circuit has been described herein using mechanical relays and switches, it is also possible to create the circuit of the present invention using solid state electronics and replacing the switching mechanisms with various types of transistors. Accordingly, the circuit of the present invention may be modified using these types of devices and incorporating other electronic devices to provide the required operational conditions for the solid state electronic devices to be used.

Various other changes to the preferred embodiments of the invention described above may be envisioned by those of ordinary skill in the art. However, those changes and modifications should be considered as part of the invention which is limited only by the scope of the claims appended hereto and their legal equivalents.

What is claimed is:

1. An electric circuit for illuminating incandescent lamps comprising:

an input for connection to a source of electric power;

a first lamp;

a first resistor;

a second lamp;

a second resistor; and means for switching the circuit between a start up circuit where a series connection of the first lamp and first resistor is connected in parallel with a series connection of the second lamp and second resistor, and an operation circuit where the first lamp is disconnected from the first resistor and the second lamp is disconnected from the second resistor and the first lamp is connected in series with the second lamp, the switching means being operable to switch the circuit from the start-up circuit to the operation circuit after the first and second lamps reach incandescence.

2. The circuit of claim 1, further comprising:

each of the first and second resistors has a resistance and the first resistor resistance is substantially equal to the second resistor resistance.

3. The circuit of claim 1, further comprising:

each of the first and second lamps has a voltage rating and the first lamp voltage rating is substantially equal to the second lamp voltage rating.

4. The circuit of claim 1, further comprising:

the source of electric power connectable to the circuit has a voltage that is equal to a sum of the first and second lamps voltages.

5. The circuit of claim 4, further comprising:

the source of electric power voltage is 42 volts DC and each of the lamps voltages is 21 volts DC.

6. The circuit of claim 1, further comprising:

each of the first lamp and second lamp has a lamp resistance when illuminated and the first lamp resistance is substantially equal to the second lamp resistance, and the first lamp resistance is substantially equal to the second resistor resistance.

7. The circuit of claim 6, further comprising:

each of the first and second lamps have a voltage drop that are substantially equal immediately after the circuit is switched from the start-up circuit to the operation circuit and the source of electric power is applied to the operation circuit.

8. The circuit of claim 1, further comprising:
the switching means comprises means to apply the source of electric power to the start-up circuit when one of the first and second lamps fails.

9. The circuit of claim 1, further comprising:
the switching means comprises means to apply the source of electric power to the start-up circuit when one of the first and second lamps is removed from the circuit.

10. An electric circuit for illuminating incandescent lamps comprising:
a first junction for connection to a source of electric power;
a second junction for connection to an electric ground;
a first electrically conductive path connecting in series the first junction, a first lamp, a first switching device and the second junction;
a second electrically conductive path connecting in series the first junction, the first switching device, a second lamp and the second junction; and
a third electrically conductive path connecting in series the first junction, the first lamp, the first switching device, the second lamp and the second junction.

11. The electric circuit of claim 10, further comprising:
the first electrically conductive path and the second electrically conductive path are connected in parallel between the first junction and the second junction.

12. The electric circuit of claim 10, further comprising:
a first resistor connected in series with the first electrically conductive path.

13. The electric circuit of claim 12, further comprising:
the first resistor being connected in series between the first switching device and the second junction.

14. The electric circuit of claim 12, further comprising:
a second resistor connected in series with the second electrically conductive path.

15. The electric circuit of claim 14, further comprising:
the second resistor being connected in series between the first junction and the first switching device.

16. A method of converting a light assembly having one or more lamps that are each operative at a first voltage for operation at a second voltage that is greater than the first voltage, the method comprising:
providing a first junction for electrical connection to a source of electric power of one lamp of the light assembly;
providing a second junction for electrical connection to an electric ground of the one lamp;
connecting the first junction in a first series circuit with a first lamp, a first switching device and the second junction;
connecting the first junction in a second series circuit with the first switching device, a second lamp and the second junction; and
connecting the first junction in a third series circuit with the first lamp, the switching device, the second lamp and the second junction where the switching device is operable to complete at least two of the first, second and third series circuits independently of each other.

17. The method of claim 16, further comprising:
alternating completing the first series circuit and the third series circuit by the switching device.

18. The method of claim 16, further comprising:
alternating completing the second series circuit and the third series circuit by the switching device.

19. The method of claim 16, further comprising:
simultaneously completing the first series circuit and the second series circuit in parallel with each other by the switching device.

20. The method of claim 16, further comprising:
alternating completing the first series circuit and the second series circuit simultaneously in parallel with each other and completing the third series circuit by the switching device.

21. The method of claim 16, further comprising:
connecting a first resistor in the first series circuit between the first lamp and the first switching device.

22. The method of claim 21, further comprising:
connecting a second resistor in the second series circuit between the first junction and the switching device.

* * * * *